(12) United States Patent
Stein

(10) Patent No.: US 6,963,574 B2
(45) Date of Patent: Nov. 8, 2005

(54) CONVERSATION OF ACCESS NETWORK BANDWIDTH DURING MULTIUSER CALL CONNECTIONS IN A BROADBAND TELEPHONY NETWORK

(75) Inventor: Robert C. Stein, Coopersburg, PA (US)

(73) Assignee: General Instrument Corporation, Horsham, PA (US)

(*) Notice: Subject to any disclaimer, the term of this patent is extended or adjusted under 35 U.S.C. 154(b) by 834 days.

(21) Appl. No.: 09/866,291

(22) Filed: May 25, 2001

(65) Prior Publication Data

US 2002/0176400 A1 Nov. 28, 2002

(51) Int. Cl.[7] ............................. H04J 3/16; H04L 12/16; H04L 12/28
(52) U.S. Cl. .................... 370/401; 370/468; 370/270; 709/221
(58) Field of Search .............................. 370/477, 468, 370/259, 260, 270, 401, 389; 709/221, 226, 228

(56) References Cited

U.S. PATENT DOCUMENTS

| | | | |
|---|---|---|---|
| 6,269,254 B1 | 7/2001 | Mathis | |
| 6,324,279 B1 | 11/2001 | Kalmanek, Jr. et al. | |
| 6,353,611 B1 | 3/2002 | Norris et al. | |
| 6,456,615 B1 * | 9/2002 | Kikinis | 370/352 |
| 2001/0043589 A1 * | 11/2001 | Kikinis | 370/352 |
| 2002/0176404 A1 * | 11/2002 | Girard | 370/352 |

* cited by examiner

*Primary Examiner*—Duc Ho
(74) *Attorney, Agent, or Firm*—Volpe and Koenig, P.C.

(57) ABSTRACT

A broadband telephony network changes a number of users in a multiuser call. The network initially has active users. Each initial active user has a one-way connection as an origin and a one-way connection as a destination. In response to a change in the number of users, for each active user maintaining an active status, the destination of one of the connections where that active user is the origin is changed while that active user remains as that connection's origin.

18 Claims, 5 Drawing Sheets

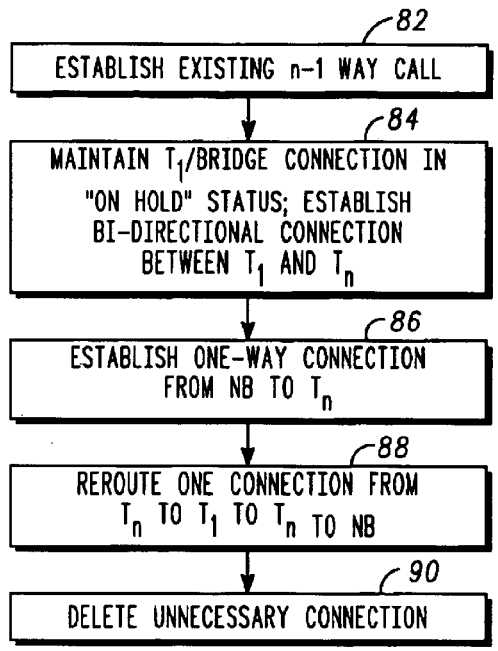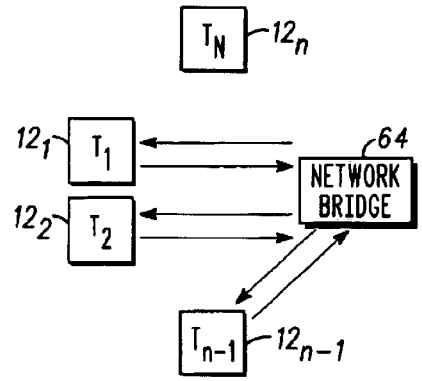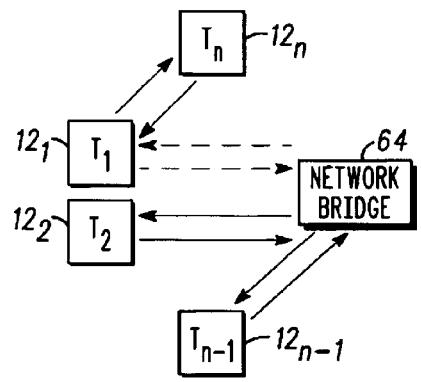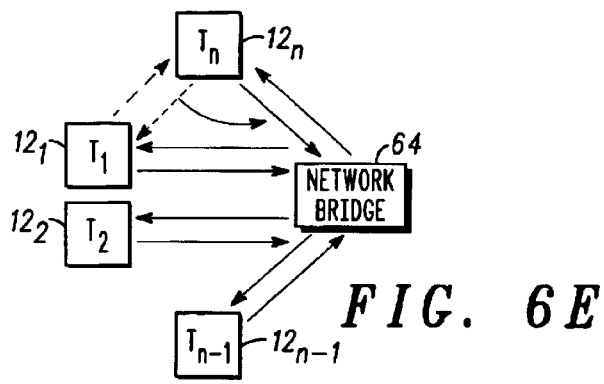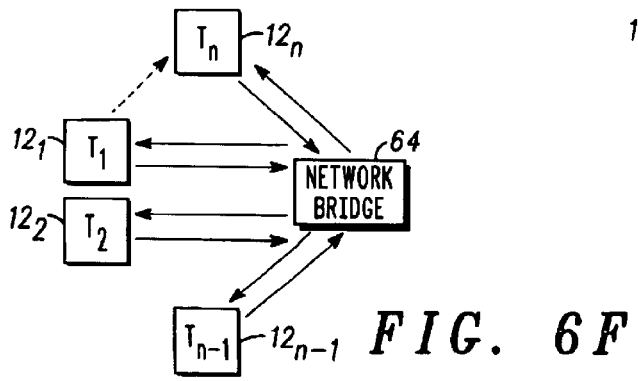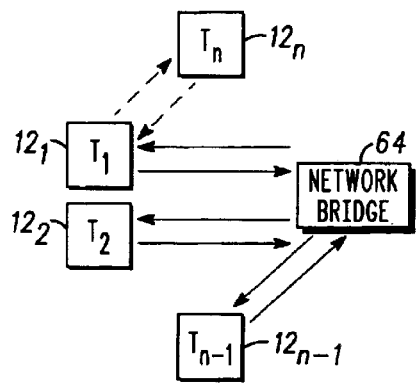

CONVERSATION OF ACCESS NETWORK BANDWIDTH DURING MULTIUSER CALL CONNECTIONS IN A BROADBAND TELEPHONY NETWORK

BACKGROUND

The invention generally relates to broadband telephony networks. In particular, the invention relates to routing telephony connections in a broadband network.

FIG. 1 illustrates a telephony network 10. Telephone users of the broadband network use telephones $12_1$ to $12_n$ connected to communication gateways (CGs), $14_1$ to $14_m$, to make telephone calls. The CGs $14_1$ to $14_m$ are used as an interface between the telephones $12_1$ to $12_n$ and the rest of the network 10.

The CGs $14_1$ to $14_m$ are connected to an Internet protocol (IP) network 18 through a cable modem termination system 16 interfacing between the CGs $14_1$ to $14_m$ and the IP network 18. The IP network 18 transfers packets of data. Each packet is sent in an assigned mini-slot of a frame in the network 18. Each packet carries communication data, such as encoded voice data, and overhead and routing data, such as a destination address.

The IP network is connected to the public switched telephone network (PSTN) 28 via a PSTN/IP network gateway 26. Telephone users $30_1$ to $30_j$ using telephones outside the broadband network can communicate with broadband network telephone users $12_1$ to $12_n$ through the PSTN 28.

The simplified hardware of a CG $14_1$ to $14_m$ is shown in FIG. 2. The CG $14_1$ to $14_m$ has an RF connector 32 to receive RF signals from and transmit RF signals over the broadband network 10. A tuner/amplifier 34 and a cable modem 36 are used to convert the received RF signals into digital baseband signals and digital baseband signals into RF signals for transmission. The CG $14_1$ to $14_m$ also has a digital signal processor (DSP) 38 and codec 40 for processing voice signals. A processor 42 along with a random access memory (RAM) 44 and non-volatile memory (NVMem) 46 are used to perform many functions, such as performing commands as directed by the call management system 20.

To handle the overhead functions of the IP network 18, a network management system 22, an operating support system 24 and a call management system 20 are used. The call management system 20, "call agent", controls telephony calls sent through the network 18. If a call or a multiparty call extends over multiple networks call managers 20 in the different networks are used to facilitate communications between the networks. Typically, the party placing the call is the "control party" and its call manager 20 controls the call connections. Additionally, depending on the size and design of a network a single network may have one or multiple call managers 20.

The simplified hardware of a call management system 20 is shown in FIG. 3. The call management system 20 comprises a call agent and a RF connector 48. The call agent 48 controls various functions of call management system 20 and interacts with other modules 22,24. Call signaling 50 sends commands to control components of the network, such as the CGs $14_1$ to $14_m$. Other components of the call management system 20 for use in performing its functions are the communications stacks 52, network interface module (NIM) 54, processor 58, RAM 60, non-volatile memory 62 and permanent storage 56.

One call agent function is to establish telephone connections between the telephone users $12_1$ to $12_n$. FIGS. 4a to 4d are a flow chart and illustrations of establishing a three-way telephone call. As shown in FIG. 4b, a bi-directional connection is established between telephone user 1, $T_1$ $12_1$ and telephone user 2, $T_2$ $12_2$. Each bi-directional connection has two opposing one-way connections. Each one-way connection in the network has an origin, a destination and at least one assigned mini-slot. Based on the bandwidth required for a connection and a network's allocation rules, multiple mini-slots may be assigned to a connection.

$T_1$ $12_1$ initiates a three-way call by placing $T_2$ $12_2$ "on hold" and placing a call to telephone user 3, $T_3$ $12_3$. As shown in FIG. 4c, the "on hold" connection between $T_1$ $12_1$ and $T_2$ $12_2$ is maintained but inactive (as shown by dashed line). A bi-directional connection is established between $T_1$ $12_1$ and $T_3$ $12_3$, 68. When $T_1$ $12_1$ initiates a three-way call, both bi-directional connections ($T_1/T_2$ and $T_1/T_3$) are broken, deleted. Simultaneously, three new bi-directional connections are established to a network bridge 64 ($T_1$/bridge, $T_2$/bridge and $T_3$/bridge), 70. The network bridge 64 can be located anywhere within the telephony network 10, which includes the broadband network, the IP network 18 and the PSTN 28. One function of the network bridge 64 is to mix the messages from multiple users to be sent to one of the users. To illustrate for user $T_2$ $12_2$, all three users $T_1$ $12_1$, $T_2$ $12_2$ and $T_3$ $12_3$ send messages to the bridge 64. The bridge 64 sends the combined messages of $T_1$ $12_1$ and $T_3$ $12_3$ without $T_2$'s message to $T_2$ $12_2$. Using the network bridge 64 eliminates the need for the telephone users $12_1$ to $12_n$ to mix voice signals. For instance, $T_1$ $12_1$ does not need to send $T_3$ $12_3$ both $T_1$'s and $T_2$'s mixed voice signals.

Using the network bridge 64 also has drawbacks. When the $T_1/T_2$ and $T_1/T_3$ connections are broken, the network 10 may not have adequate bandwidth to establish the three new bi-directional connections. Initially, there are four one-way connections (two bi-directional connections) between $T_1$ $12_1$, $T_2$ $12_2$ and $T_3$ $12_3$. After establishing connections to the bridge 64, six (6) one-way connections (three bi-directional connections) are established requiring additional bandwidth for the two extra one-way connections. Furthermore, due to the mixing at the bridge 64, the connections originating from the bridge 64 may use higher rate voice coders requiring additional bandwidth. As a result, all of the connections may be lost. Accordingly, it is desirable to have alternate approaches to multi-user connection.

SUMMARY

A broadband telephony network changes a number of users in a multiuser call. The network initially has active users. Each initial active user has a one-way connection as an origin and a one-way connection as a destination. In response to a change in the number of users, for each active user maintaining an active status, the destination of one of the connections where that active user is the origin is changed while that active user remains as that connection's origin.

BRIEF DESCRIPTION OF THE DRAWING(S)

DETAILED DESCRIPTION OF THE PREFERRED EMBODIMENT(S)

Figure 1:
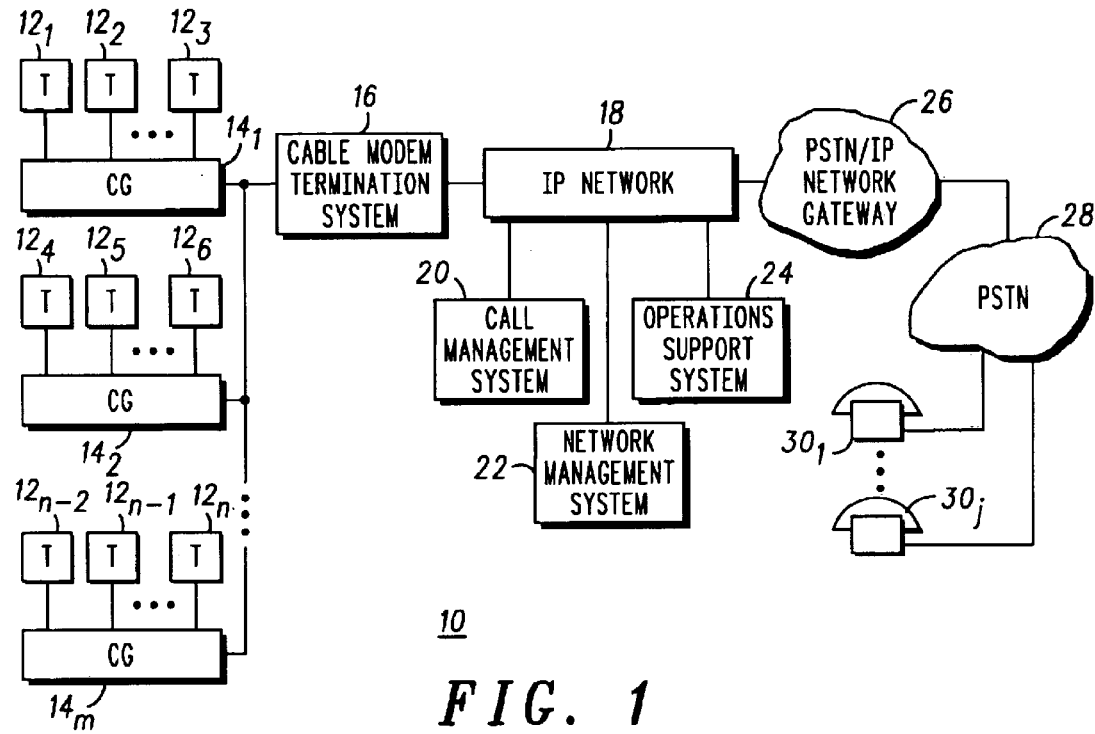
FIG. 1 is an illustration of a broadband telephony network.
Figure 2:
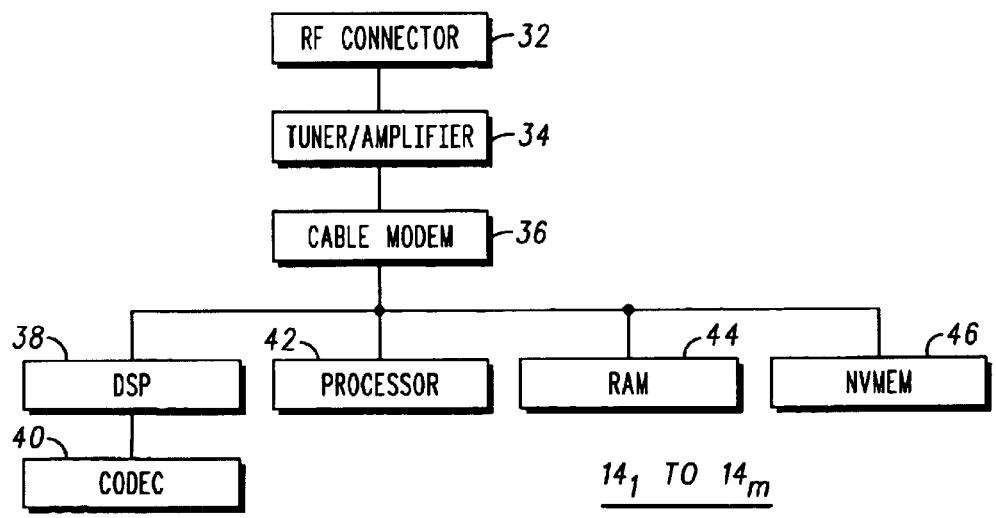
FIG. 2 is an illustration of a communication gateway.
Figure 3:
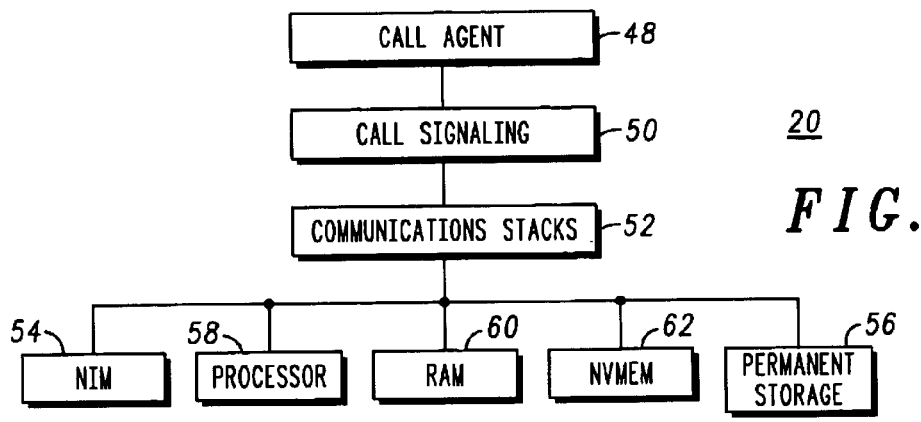
FIG. 3 is an illustration of a call management system/call agent.
Figure 4A:
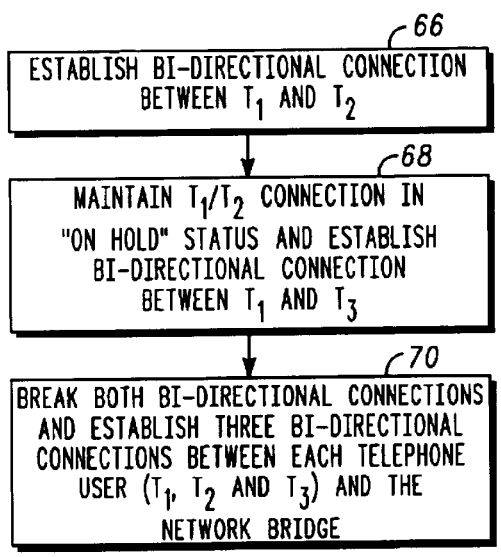
FIG. 4 is a flow chart of establishing a related art three-way call.
FIGS. 4b to 4d are illustrations of establishing a related art three-way call.
Figure 4B:
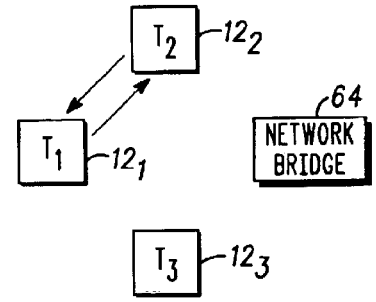
Figure 4C:
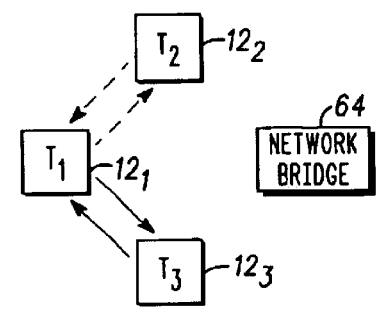
Figure 4D:
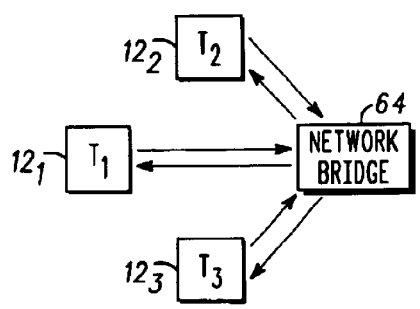
Figure 5A:
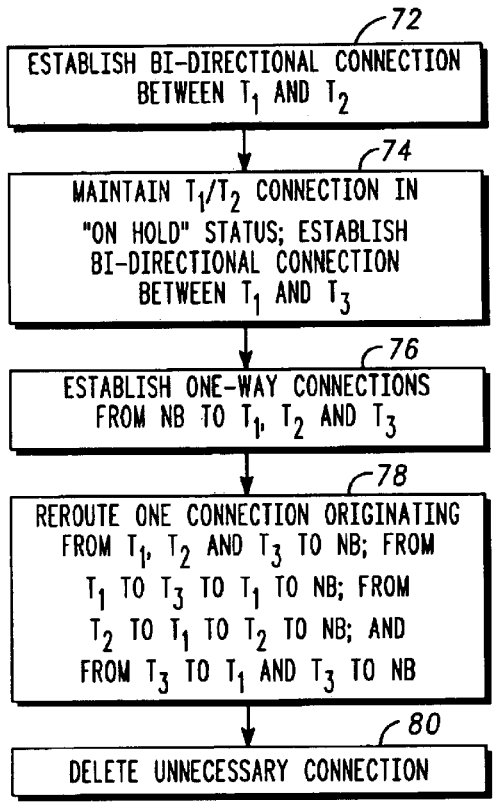
Figure 5B:
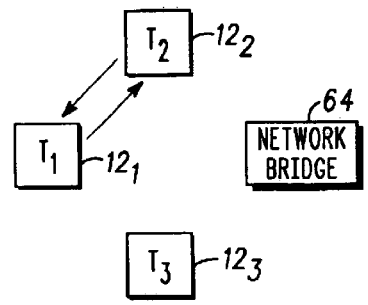
Figure 5C:
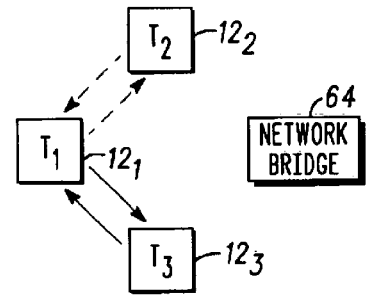

FIGS. 5a to 5f are a flow chart and illustrations of a three-way call connection. $T_1$ $12_1$ and $T_2$ $12_2$ are initially communicating and a bi-directional connection exists between $T_1$ $12_1$ and $T_2$ $12_2$, as shown in FIG. 5b, 72. $T_1$ $12_1$ places $T_2$ $12_2$ "on hold" and that connection is maintained but made inactive, as shown by the dashed lines in FIG. 5c. $T_1$ $12_1$ initiates a call with $T_3$ $12_3$. A new bi-directional connection between $T_1$ $12_1$ and $T_3$ $12_3$ is established as shown in FIG. 5c, 74.

Figure 5D:
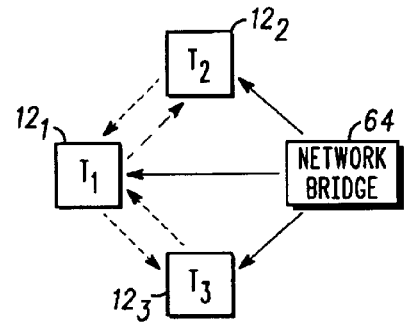
Figure 5E:
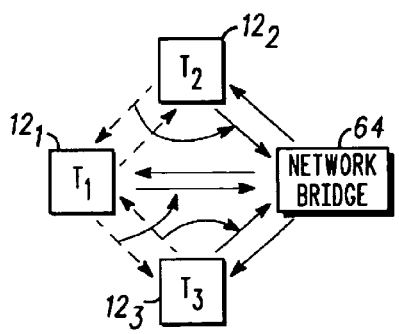
Figure 5F:
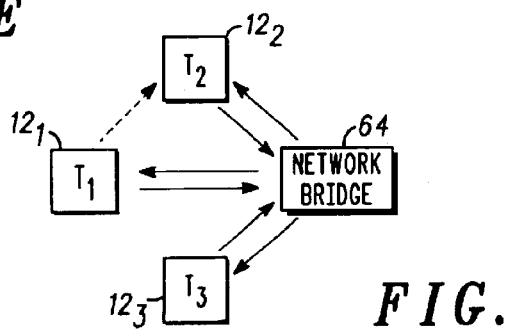

To initiate a three-way call, $T_1$ $12_1$ sends a signal. The bi-directional connections between $T_1$ $12_1$, $T_2$ $12_2$, and $T_3$ $12_3$ are maintained but temporarily inactive. The network bridge 64 establishes a one-way connection from the bridge 64 to each telephone user $12_1$ to $12_3$ as shown in FIG. 5d, 76. As shown in FIG. 5e, the connections originating from each user $12_1$ to $12_3$ are rerouted to the bridge, 78. The one-way connection from $T_1$ $12_1$ to $T_3$ $12_3$ is routed to terminate at the bridge 64. Likewise, the one-way connections from $T_2$ $12_2$ to $T_1$ $12_1$ and $T_3$ $12_3$ to $T_1$ $12_1$ are rerouted to terminate at the bridge 64. The previous routing for the connections is shown by a dotted line. Since the user $12_1$ to $12_3$ of each rerouted connection is the same, the bandwidth requirements of each rerouted connection are the same. To reroute these connections, the call agent 20 simply directs that the destination addresses in the packets associated with the rerouted connections be changed. Voice communication between all three users $12_1$ to $12_3$ is then achieved through the bi-directional connections between the bridge 64 and each user $12_1$ to $12_3$. After the rerouting is completed, the unnecessary one-way connection between $T_1$ $12_1$ and one of the other users, such as $T_2$ $12_2$, is deleted, as shown in FIG. 5f as a dotted line, 80.

The call agent 20 directs the rerouting of calls, the establishing and deleting of connections between the users $12_1$ to $12_3$ and establishing the bridge 64 using its call signaling 50, processor 58 and associated RAM 60 and instructions stored in its NVMem 62. The CG $14_1$ to $14_m$ and bridge 64 perform the routing commands as directed by the call agent 20. The CGs $14_1$ to $14_m$ will receive the downstream commands and perform the rerouting of its connections using their processors 42, associated RAM 44 and instructions stored in its NVMem 46.

One advantage to the approach of FIGS. 5a to 5f is that the routing complexity of the CG $14_1$ to $14_m$ is reduced. The CG $14_1$ to $14_m$ merely changes the destination of its transmitted packets instead of being assigned new packets and mini-slots. However, the complexity at the call agent 20 is increased due to the increase in routing.

If any of the new connections of FIG. 5d cannot be made, the approach of FIGS. 5a and 5d allows for a graceful recovery. Since the initial connections between the users $12_1$ to $12_3$ are maintained while the bridge 64 establishes one-way connections between it 64 and the users $12_1$ to $12_3$, if any of the new one-way connections can not be established, the original connections between the users $12_1$ to $12_3$ can be reactivated. This approach reduces the chance that a call will be dropped.

One drawback to this approach is for a short period of time, seven one-way connections are required, as shown in FIGS. 5d and 5e. As a result, excess bandwidth is allocated for a short period of time. To eliminate the excess bandwidth allocation, the extra connection can be deleted at the same time the bridge establishes the three one-way connections, such as deleting the extra $T_1$ to $T_2$ connection, as in FIG. 5f. As a result, only a maximum of six (6) one-way connections are required. However, only a graceful recovery between two of the users, such as $T_1/T_3$, is readily achieved. Due to the deleted extra connection, a graceful recovery between the other users, such as $T_1/T_2$, may not be possible. Accordingly, a trade-off between ease of recovery and allotted bandwidth is achieved.

The approach of FIGS. 5a to 5f can be applied to more than a three-way call, such as an n-way call. Illustrations and a flow chart of an n-way call using the approach of FIGS. 5a to 5f are shown in FIGS. 6a to 6f. $T_1$ desires to add an $n^{th}$ user, $T_n$ $12_n$, to an existing n–1-way call. As shown in FIG. 6c, an n–1-way call with connections to the bridge 64 exists. $T_1$ $12_1$ temporarily drops out of the n–1-way call, such as by performing a "hook flash," and establishes a bi-directional connection to $T_n$ $12_n$, as shown in FIG. 6c, 84. $T_1$ $12_1$ initiates adding $T_n$ $12_n$ to the call, such as by a "hook flash" signal. A one-way connection from the bridge 64 to $T_n$ $12_n$ is established, as shown in FIG. 6d, 86. As shown in FIG. 6e, the one-way connection from $T_n$ to $T_1$ is rerouted to terminate at the bridge 64, 88. Subsequently, the excess connection is deleted, as shown in FIG. 6f, 90.

Figure 7A:
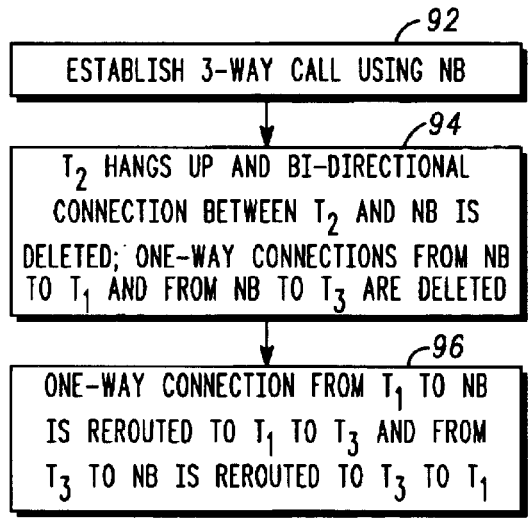
Figure 7B:
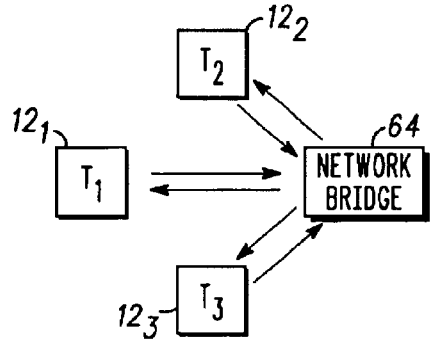
Figure 7C:
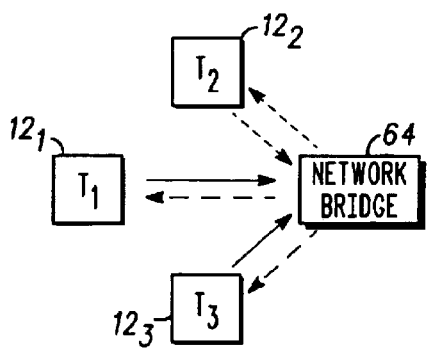
Figure 7D:
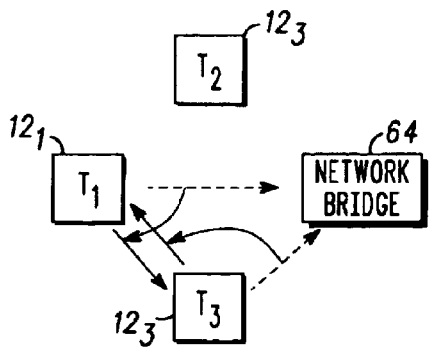

FIGS. 7a to 7d are a flow chart and illustrations for dropping a user from a three-way call, such as $T_2$ $12_2$. As shown in FIG. 7b, a bi-directional connection exists between each user, $T_1$ $12_1$, $T_2$ $12_2$ and $T_3$ $12_3$, and the bridge 64, 92. After $T_2$ $12_2$ hangs up the one-way connection the bridge 64 to $T_1$ $12_1$ and $T_3$ $12_3$ are deleted, as shown in FIG. 7c, 94. To connect $T_1$ $12_1$ to $T_3$ $12_3$, as shown in FIG. 7d, the connection from $T_1$ $12_1$ to the bridge 64 is rerouted to terminate at $T_3$ $12_3$ and the connection from $T_3$ $12_3$ to the bridge 64 is rerouted to terminate at $T_1$ $12_1$. Since the bandwidth for the connections originating from each user $12_1$, $12_3$ are unchanged, the rerouting is simply performed by changing the destination address of the packets associated with the connections.

The network changes a number of active users in a multiuser call. The network compromises: a plurality of communication gateways of a broadband network and a call agent. Each gateway is capable of participating in a multiuser call with a changing number of users. Each gateway compromises a processor for receiving commands from a call agent and changing characteristics of connections associated with the commands gateway in response to commands. The call agent for produces commands associated with connections of the multiuser call and in response to the change in the number of users, the commands direct one of the communication gateways to change the destination of a connection of the one gateway where that one gateway is maintained as an origin of that one gateway connection.

Additionally, for that network, the destination changing connection maintains a bandwidth associated with the destination changing connection; the destination changing maintains an assigned mini-slot associated with the destination changing connection; or the destination change is performed by changing a destination address associated with packets of that one gateway connection.

A call agent changes a number of users in a multiuser call. The call agent comprises a call signaling block for producing commands associated with connections of the multiuser call, and in response to the change in the number of users, the commands direct one user of the multiuser call to change the destination of a connection of the one user where that one user is maintained as an origin of that connection.

Additionally, for the call agent, the destination changing connection maintains a bandwidth associated with the destination changing connection; the destination changing connection maintains an assigned mini-slot associated with the destination changing connection; and the destination changing connection changes its destination by changing a destination address associated with packets of the destination changing connection.

A communication gateway of a broadband telephony network, which is capable of participating in a multiuser call with a changing number of users. A call agent associated with the communication gateway produces commands for directing connections involving the communication gateway. The communication gateway comprises an RF connector and associated tuner for receiving commands and messages over connections of the network and for transmitting messages over connections of the network. A processor has an input configured to receive the received commands and in response to receiving commands associated with the number of users change, changes a destination of messages transmitted by the communication gateway over one of the transmitting connections while maintaining other characteristics of the connection.

Additionally, for the communication gateway, one of the other characteristics is a bandwidth of the one connection; one of the other characteristics is an assigned mini-slot associated with the one connection; and the destination change of the one connection is performed by changing a destination address associated with packets of the one connection.

What is claimed is:

1. A method for changing a number of active users in a multiuser call in a broadband telephony network, the network capable of establishing and deleting connections between the users, the method comprising:

for each user initially in an active status, providing a one-way connection with that initial active user as the destination and a one-way connection with that initial active user as an origin;

changing a number of active users in the multiuser call;

in response to the user number change, for one of the users having the initial active status, changing the destination of one of that maintained one active user's connections where that one active user is the origin while that active user remains as that one connection's origin; and establishing and maintaining one-way connections as needed so that each of the active users having the active status has a one-way connection where that active user is an origin and that active user is a destination.

2. The method of claim 1 wherein after the establishing and maintaining one-way connections as needed, deleting any unused one-way connections.

3. The method of claim 1 wherein the establishing one-way connections is performed prior to changing the destinations.

4. The method of claim 1 wherein the destination changing connection maintains a bandwidth associated with the destination changing connection.

5. The method of claim 1 wherein the destination changing connection maintaining an assigned mini-slot associated with the destination changing connection.

6. The method of claim 1 wherein the destination changing connection changes its destination by changing a destination address associated with packets of the destination changing connection.

7. A network for changing a number of active users in a multiuser call, the network comprises:

a plurality of communication gateways of a broadband network, each gateway capable of participating in a multiuser call with a changing number of users, each gateway comprises:

a processor for receiving commands from a call agent and changing characteristics of connections associated with the commands gateway in response to commands; and the call agent for producing commands associated with connections of the multiuser call and in response to the change in the number of users, the commands direct one of the communication gateways to change the destination of a connection of the one gateway where that one gateway is maintained as an origin of that one gateway connection.

8. The network of claim 7 wherein the destination changing connection maintains a bandwidth associated with the destination changing connection.

9. The network of claim 7 wherein the destination changing maintains an assigned mini-slot associated with the destination changing connection.

10. The network of claim 7 wherein the destination change is performed by changing a destination address associated with packets of that one gateway connection.

11. A call agent for changing a number of users in a multiuser call, the call agent comprising:

a call signaling block for producing commands associated with connections of the multiuser call, in response to the change in the number of users, the commands direct one user of the multiuser call to change the destination of a connection of the one user where that one user is maintained as an origin of that connection.

12. The call agent of claim 11 wherein the destination changing connection maintains a bandwidth associated with the destination changing connection.

13. The call agent of claim 11 wherein the destination changing connection maintains an assigned mini-slot associated with the destination changing connection.

14. The call agent of claim 11 wherein the destination changing connection changes its destination by changing a destination address associated with packets of the destination changing connection.

15. The communication gateway of claim 14 wherein one of the other characteristics is a bandwidth of the one connection.

16. The communication gateway of claim 14 wherein one of the other characteristics is an assigned mini-slot associated with the one connection.

17. The communication gateway of claim 14 wherein the destination change of the one connection is performed by changing a destination address associated with packets of the one connection.

18. A communication gateway of a broadband telephony network, the communications gateway capable of participating in a multiuser call with a changing number of users, a call agent associated with the communication gateway produces commands for directing connections involving the communication gateway, the communication gateway comprising:

an RF connector and associated tuner for receiving commands and messages over connections of the network and for transmitting messages over connections of the network; and a processor having an input configured to receive the received commands and in response to receiving commands associated with the number of users change, changing a destination of messages transmitted by the communication gateway over one of the transmitting connections while maintaining other characteristics of the connection.

* * * * *